United States Patent
Petersson (10) Patent No.: US 10,078,565 B1
(45) Date of Patent: Sep. 18, 2018

(54) ERROR RECOVERY FOR REDUNDANT PROCESSING CIRCUITS

(71) Applicant: Xilinx, Inc., San Jose, CA (US)

(72) Inventor: Leif Roland Petersson, Molndal (SE)

(73) Assignee: XILINX, INC., San Jose, CA (US)

( * ) Notice: Subject to any disclaimer, the term of this patent is extended or adjusted under 35 U.S.C. 154(b) by 177 days.

(21) Appl. No.: 15/184,879

(22) Filed: Jun. 16, 2016

(51) Int. Cl.
 *G06F 11/00* (2006.01)
 *G06F 11/20* (2006.01)
 *G06F 11/14* (2006.01)

(52) U.S. Cl.
 CPC ...... *G06F 11/2033* (2013.01); *G06F 11/1471* (2013.01); *G06F 2201/805* (2013.01)

(58) Field of Classification Search
 CPC .................................................. G06F 11/2033
 USPC ................. 714/11, 10, 12, 13, 4.11
 See application file for complete search history.

(56) References Cited

U.S. PATENT DOCUMENTS

| 4,785,453 A * | 11/1988 | Chandran ............... G06F 11/10 714/25 |
| 2002/0144177 A1* | 10/2002 | Kondo ................ G06F 11/1441 714/13 |

\* cited by examiner

*Primary Examiner* — Dieu-Minh Le
(74) *Attorney, Agent, or Firm* — LeRoy D. Maunu; Jonathan B. Sioke; Kevin T. Cuenot (57) ABSTRACT

Methods and circuits are disclosed for error recovery in redundant processing systems. Respective instances of a software program are executed in lockstep on redundant processing circuits. Using a control circuit, in response to detecting a non-fatal error, an interrupt is generated and non-functioning ones of the processing circuits are disabled. The interrupt is serviced using the functional processing circuits operating in lockstep. In servicing the interrupt, a processing state of the processing circuits is stored and a reset of the processing circuits is triggered. Following the reset, the processing circuits are configured to operate in lockstep. The state of the processing circuits is restored to the stored processing state and a return from the interrupt is signaled. In response to the signaled return from interrupt, execution of the software program is resumed on the processing circuits in lockstep at a point at which the non-fatal error was detected.

20 Claims, 8 Drawing Sheets

ERROR RECOVERY FOR REDUNDANT PROCESSING CIRCUITS

TECHNICAL FIELD

The disclosure generally relates to the detection and recovery from errors in integrated circuits.

BACKGROUND

Programmable integrated circuits (ICs), such as field programmable gate arrays (FPGAs), are user configurable ICs capable of implementing various digital logic operations. FPGAs include programmable logic circuits such as configurable logic blocks (CLBs) arranged in rows and columns, input/output blocks (IOBs) surrounding the CLBs, and programmable interconnect lines that extend between the rows and columns of CLBs. The CLBs, IOBs, and interconnect lines are configured to implement a particular design according to configuration data stored in configuration memory of the programmable IC.

The versatility of programmable ICs is advantageous in applications, such as those requiring high availability, high reliability, or functional safety, where remote reconfiguration is preferred over physical replacement. However, with the reduction in device geometry, atmospheric radiation such as neutrons can cause an error in bi-stable circuits. Such errors are known as a single event upsets (SEUs) or soft errors. When a single heavy ion strikes a silicon substrate, it loses energy through the creation of free electron hole pairs. This results in a dense ionized track in the local region, generating a current pulse that can upset the circuit. An SEU can also be caused by alpha particles. Alpha particles are generated when a neutron strikes a silicon substrate. The alpha particles travel through the substrate and generate charge clusters within a limited silicon volume. Alpha particles can be generated from high energy neutrons as well as neutrons that have lost enough kinetic energy to be at thermal equilibrium with the operating environment. Alpha particles can also be generated through the decay of semiconductor packages that contain small amounts of radioactive contaminants.

In a programmable IC, an SEU may induce errors in configuration memory cells used to configure programmable logic circuits to perform specific functions, thereby changing the configuration of a user circuit design implemented by the programmable logic circuits. An SEU may additionally or alternatively induce errors by changing the value of a bi-stable circuit (e.g., a flip flop or latch) included in a user circuit design that is implemented by the programmable logic circuits.

In some applications, SEUs are mitigated by implementing three redundant copies of a circuit along with a majority voter to ensure that a correct value is output while a logic upset occurs in one of the redundant copies. This is known as triple modular redundancy (TMR).

SUMMARY

Methods and circuits are disclosed for recovery from errors in redundant processing systems. In an example implementation, respective instances of a software program are executed on three or more redundant processing circuits of a processing system in lockstep. In response to detecting a non-fatal error in one or more of the processing circuits, a control circuit is used to generate an interrupt and disable non-functioning ones of the processing circuits. The interrupt is serviced using the functional ones of the processing circuits operating in lockstep. In servicing the interrupt, a processing state of the processing circuits is stored and a reset of the processing circuits is triggered. Following the reset, the three or more processing circuits are configured to operate in lockstep. The state of the processing circuits is restored to the stored processing state and a return from the interrupt is signaled. In response to the signaled return from interrupt, the three or more processing circuits continue execution of the software program in lockstep at a point at which the non-fatal error was detected.

In another implementation, an apparatus includes a set of processing circuits. The processing circuits are configured to execute respective instances of a software program in lockstep. The apparatus further includes a control circuit coupled to the set of processing circuits. In response to a signal indicative of a non-fatal error in the set of processing circuits, the control circuit disables non-functioning ones of the processing circuits and generates a recovery interrupt signal. The processing circuits are further configured to service the recovery interrupt. In servicing the recovery interrupt, functional ones of the processing circuits store a processing state of the processing circuits and trigger a reset of the processing circuits. The control circuit is further configured to restore the state of the processing circuits to the stored processing state following the reset. The processing circuits are further configured to signal a return from the interrupt after being restored to the stored processing state. In response to the signaled return from interrupt, the processing circuits continue execution of the software program in lockstep at a point at which a non-fatal error was detected.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Methods and circuits are disclosed for error recovery in redundant processing systems. Some approaches for error recovery utilize restore points to periodically save a state of a system. When error is detected the system is restored to the state of the more recent restore point prior to the occurrence of the error. Another approach removes error by resetting the entire system. Both of these approaches require processing to be repeated before the system is restored to the same point at which the error occurs.

Certain implementations are configured to recover from errors without having to repeat processing steps that occurred prior to encountering the error. In an example implementation, a processing system includes three or more redundant processing circuits configured to execute respective instances of a software program in lockstep. The processing circuits are functionally equivalent to each other. The processing system further includes one or more error detection circuits configured to detect errors in the processing circuits based on a comparison of signals output by the processing circuits. For example, if one of the processing circuits is in error, the signal output by the processing circuit will be different from that output by a majority of the processing circuits. In one or more implementations, the system is configured to recover from errors in the processing circuits, without reset of the entire system, via servicing of a recovery interrupt by the processing circuits. For ease of reference, an error that is limited to a minority of the processing circuits and recoverable via servicing of the recovery interrupt, may be referred to as a non-fatal error. In addition to non-fatal errors, errors may also occur in various other circuits in the system that may require power-on-reset to remove the error. For example, an error in an error detection circuit may cause the circuit to incorrectly identify which processing circuit is in error, falsely identify errors, or fail to identify errors entirely. For ease of reference, an error occurring within error detection circuitry may be referred to as a fatal error. In some implementations, the system may include redundant circuits for detection of errors. A fatal error is detected when the redundant error detection circuits generate different output signals.

In some implementations, the processing system further includes a control circuit configured to initiate recovery from fatal and non-fatal errors. In response to a signal indicative of a non-fatal error in the processing circuits, the control circuit disables non-functioning ones of the processing circuits and generates a recovery interrupt signal. The functional processing circuits are configured to service the recovery interrupt. In servicing the recovery interrupt, functional processing circuits store a processing state of the processing circuits and trigger a reset of the processing circuits. Reset restores the redundant processing circuits to a state of the circuits when initially powered on. The control circuit is further configured to restore the state of the redundant processing circuits to the stored processing state following the reset. The processing circuits are further configured to signal a return from the interrupt after being restored to the stored processing state. In response to the signaled return from interrupt, the redundant processing circuits continue execution of the software program in lockstep from an instruction in the program at which a non-fatal error was detected. From the perspective of the software program, the non-fatal error and the recovery process never occurred.

The disclosed circuits and methods may be used to facilitate recovery of errors in various processing systems having various numbers and types of redundant processing circuits. While embodiments are not so limited, for ease of explanation, the examples are primarily discussed with reference to processing systems including three processing circuits. In different implementations, the redundant processing circuits may be formed using hard-wired logic circuits, such as application specific ICs (ASICs), or using programmable logic resources (e.g., in a programmable IC).

Figure 1:
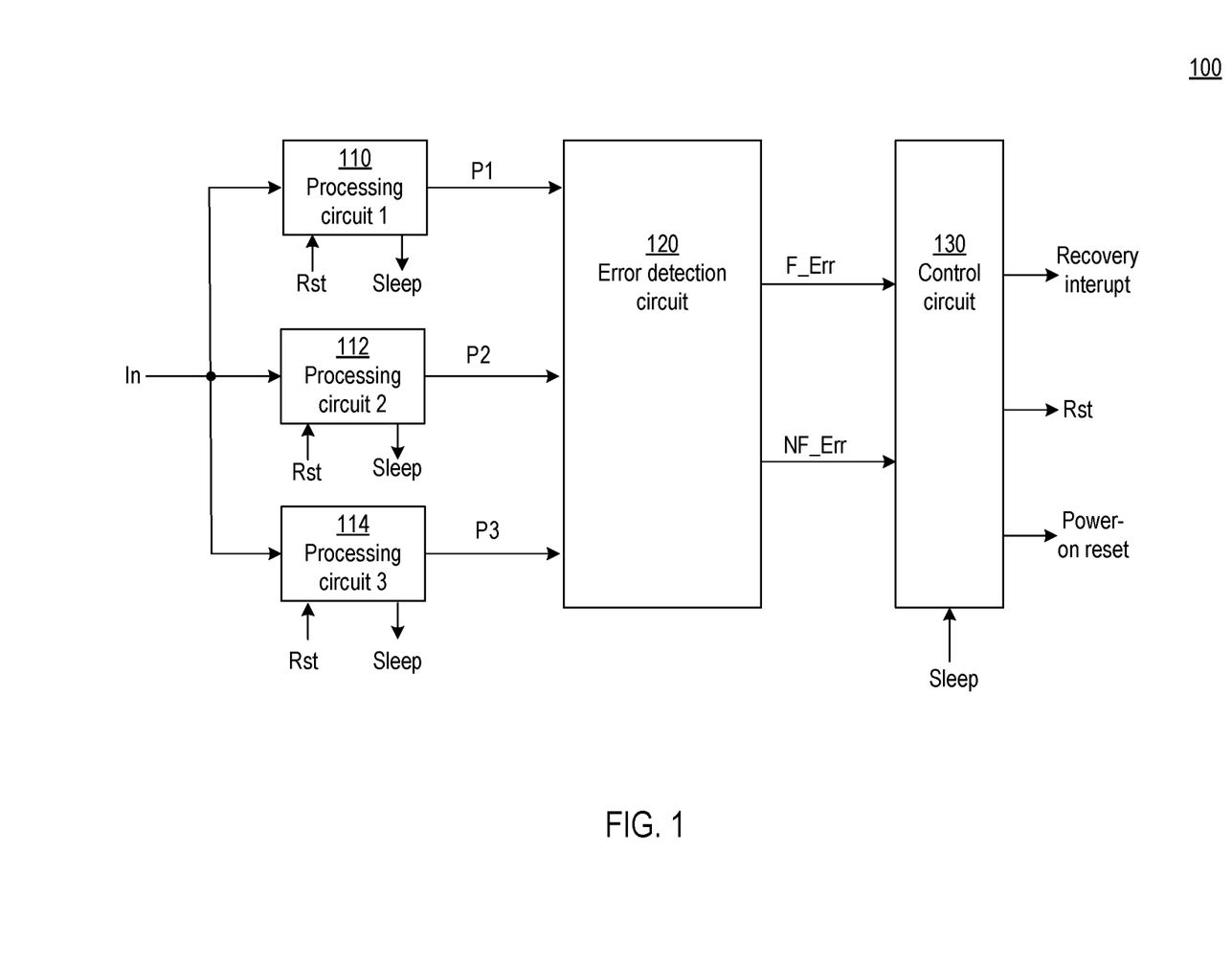
FIG. 1 shows a first system for processing of a software program with redundant processing circuits, in accordance with one or more implementations.

Turning now to the figures, FIG. 1 shows a system 100 for executing a software program by redundant processing circuits (e.g., multiple instances of the same processing circuit). In this example, the system 100 includes three redundant processing circuits 110, 112, and 114, an error detection circuit 120, and a control circuit 130. The processing circuits 110, 112, and 114 are functionally equivalent to each other. The processing circuits 110, 112, and 114 are configured to execute respective instances of a software program in lockstep. The error detection circuit 120 is configured to detect errors in the processing circuits 110, 112, and 114 based on a comparison of the respective data values P1, P2, and P3 output by the processing circuits 110, 112, and 114. The error detection circuit 120 generates a first signal (NF_Err) in response to detecting a non-fatal error and generates a second signal (F_Err) in response to detecting a fatal error in the processing circuits 110, 112, and 114 or error detection circuit 120.

The control circuit 130 is configured to initiate recovery from detected errors indicated by the error detection circuit. In response to the F_Err signal indicative of a fatal error, the control circuit generates a power-on-reset signal. The power-on-reset signal triggers a power-on-reset of the system 100. Power-on-reset cycles power of all circuits in the system 100 to restore the entire system 100 in an initial state when powered on. In response to the NF_Err signal indicative of a non-fatal error, the control circuit 130 disables non-functioning ones of the processing circuits 110, 112, and 114 and generates a recovery interrupt. The recovery interrupt, prompts functioning ones of the processing circuits, 110, 112, and 114 to halt execution of the software program and service the interrupt. In servicing the interrupt, a processing state of the functioning processing circuits is stored and a reset of the processing circuits 110, 112, and 114 is initiated. The processing circuits may initiate reset, for example, by directing a circuit in the system (e.g. control) to reroute a sleep output signal to a reset terminal of the processing circuits and execute a sleep instruction. Prior to initiating the reset, a status register is also set (e.g., by the control circuit or while servicing the interrupt) to indicate that the system is in a recovery mode.

In response to a sleep output signal generated by the execution of the sleep instruction, the control circuit generates a reset signal (Rst), which resets the processing circuits 110, 112, and 114 without resetting the entire system. Following reset in the recovery mode, the processing circuits 110, 112, and 114 are restored to the previously stored processing state. Following restoration of the processing state, the processing circuits execute a return from the recovery interrupt and continue lockstep execution of the software program from the instruction in the program at which the non-fatal error was previously detected.

Figure 2:
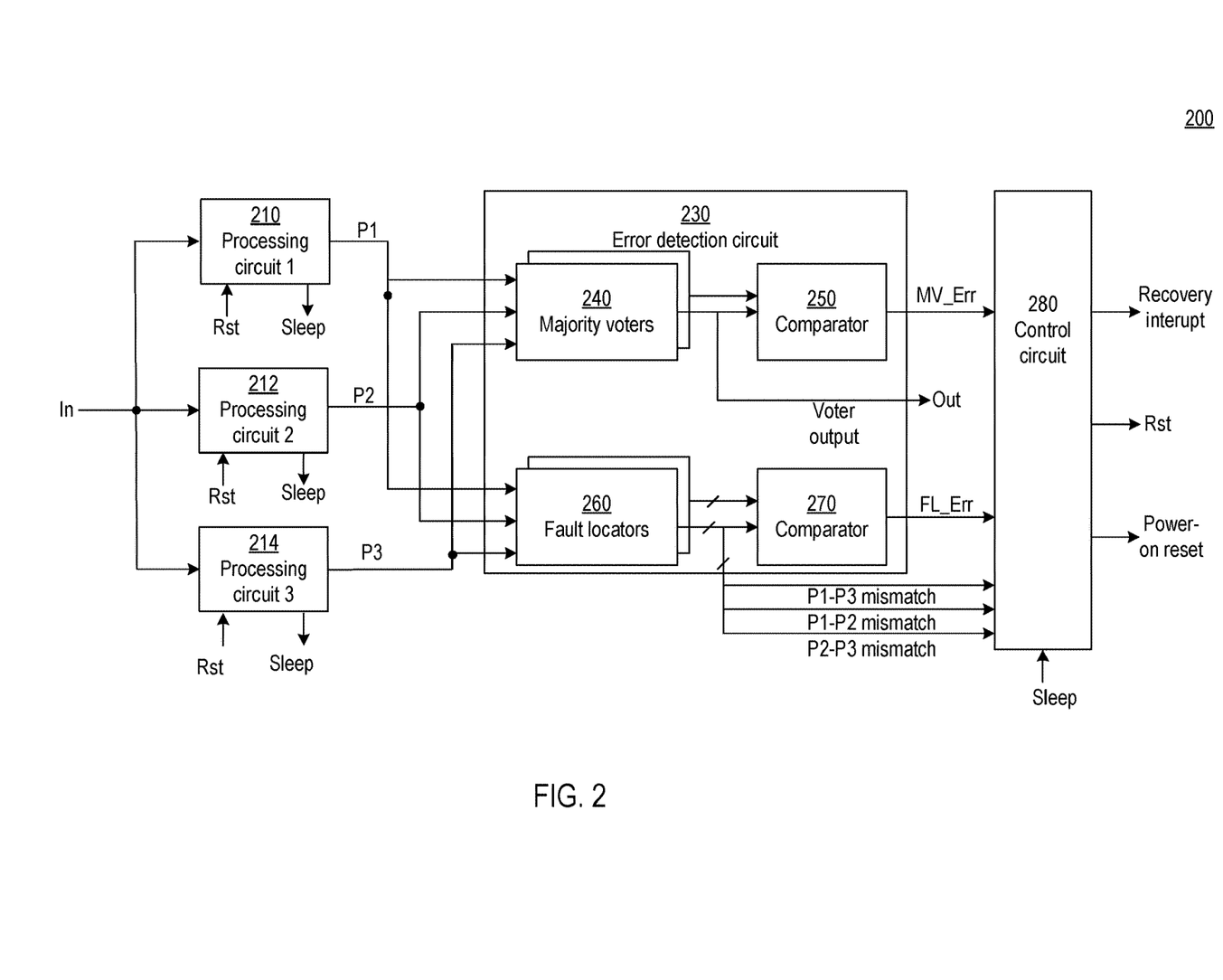
FIG. 2 shows a first system for processing of a software program with redundant processing circuits, in accordance with one or more implementations.

FIG. 2 shows a system for executing a software program by redundant processing circuits. The system 200 includes processing circuits 210, 212, 214, an error detection circuit 230, and a control circuit 280 configured as described with reference to processing circuits 110, 112, 114, error detection circuit 120, and control circuit 130 in FIG. 1.

As described with reference to error detection circuit 120, error detection circuit 230 is configured to detect fatal and non-fatal errors in the processing circuits 210, 212, and 214, based on a comparison of signals P1, P2, and P3 output by the processing circuits. The error detection circuit 230 may include various different circuits for comparison and analysis of the signals P1, P2, and P3. In this example, the error detection circuit 230 includes multiple majority voter circuit(s) 240, and each majority voter circuit is configured to output a value equal to a majority of the signals P1, P2, and P3 output by the processing circuits. If one of the signals P1, P2, and P3 is in error, the output value of the majority voter circuit is still equal to the correct error-free value. The output signal from one of the majority voter circuits is the output signal (Out) from the error detection circuit.

Alternatively or additionally, the error detection circuit 230 may include a plurality of fault locator circuits 260, and each fault locator circuit is configured to generate a set of signals indicative of locations of errors in the processing circuits 210, 212, and 214. In this example, each fault location circuit 260 generates three signals P1-P3, P1-P2, and P2-P3 indicating whether or not each combination of the P1, P2, and P3 signals is matching or mismatched. Together, the P1-P3, P1-P2, and P2-P3 signals identify one of the processing circuit having a non-fatal error or indicate that a fatal error has occurred in the error detection circuit. For each combination of the P1-P3, P1-P2, and P2-P3 signals, TABLE 1 either identifies the location of a non-fatal error in a particular one of the processing circuits or indicates that the error is a fatal error. The fatal errors correspond to combinations of the P1-P3, P1-P2, and P2-P3 signals that are not possible and therefor indicate an error in the fault location circuits 260.

TABLE 1

| Mismatch 2-3 | Mismatch 1-3 | Mismatch 1-2 | |
|---|---|---|---|
| 0 | 0 | 0 | No faults |
| 0 | 0 | 1 | Fatal |
| 0 | 1 | 0 | Fatal |
| 0 | 1 | 1 | #1 Faulty |
| 1 | 0 | 0 | Fatal |
| 1 | 0 | 1 | #2 Faulty |
| 1 | 1 | 0 | #3 Faulty |
| 1 | 1 | 1 | Fatal |

Fatal errors may also occur when an error occurs in the majority voter circuits 240 or the fault locator circuits 260. For instance, when an error occurs in majority voter circuits 240 it is not known whether the voter output is correct. Similarly, when an error occurs in fault locator circuits 260 it is not known whether the P1-P3, P1-P2, and P2-P3 mismatch signals are correct. In this example, comparator circuit 250 compares the output of the majority voter circuits 240 to detect errors in the majority voter circuits 240. If the majority voters circuits 240 output different values, comparator circuit 250 outputs a signal (MV_Err) indicative of a fatal error. Similarly, comparator circuit 270 compares output of the fault locator circuits 260 to detect errors in the fault locator circuits 260. If the fault locator circuits 260 output different values, comparator circuit 270 outputs a signal (FL_Err) indicative of a fatal error.

In some implementations, the processing circuits and/or error detection circuit may be implemented in programmable resources of a programmable IC. As previously described, programmable resources may be configured to form various circuits by writing program data to a configuration memory. In some implementations, an error detection circuit (e.g., 120 or 230) may be configured to periodically check the configuration memory to verify that the program data has not been corrupted. Verification may be performed, for example, by calculating a hash or checksum value from the values in configuration memory and comparing the result with a previously computed hash or checksum value. If the compared hash/checksum values are different, the values in the configuration memory are corrupt. The error detection circuit 120 or 230 may signal a fatal error to prompt the control circuit 130 or 280 to perform a power-on-reset of the system to remove the error from the configuration memory.

Figure 3:
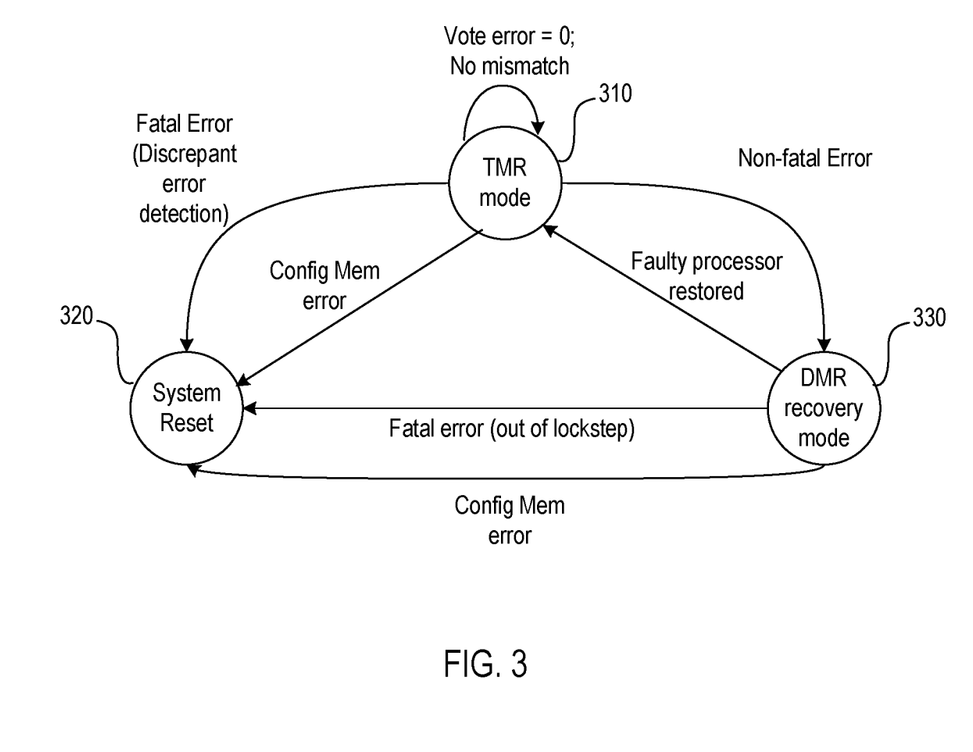
FIG. 3 shows a flowchart depicting operation of a redundant processing system including TMR processing circuits, in accordance with one or more implementations.

FIG. 3 shows a flowchart depicting operation of a redundant processing system including TMR processing circuits, in accordance with one or more implementations. At startup, the system (e.g., FIG. 2, 200) is operated in a TMR mode 310 in which all of the TMR processing circuits are operated in lockstep. As previously discussed, outputs of the processing circuits are monitored during operation to detect errors.

As previously described, a fatal error may be detected if redundant error detection circuits provide discrepant results. In programmable logic implementations, a fatal error may also occur in double modular redundancy (DMR) recovery mode 330 if data in configuration memory of the programmable IC becomes corrupt. In response to detecting a fatal error, the system transitions to a system reset mode 320, where power-on-reset of the entire system is performed to remove the fatal error. Power-on-reset of the system places the system back in TMR mode 310.

In response to detecting a non-fatal error in the TMR processing circuits, the system 200 transitions to the DMR recovery mode 330, where the processing circuit is disabled and the remaining two processing circuits are operated in lockstep. As described in more detail with reference to FIGS. 4 and 5, the functionally equivalent processing circuits can service a recovery interrupt to remove the error and restore operation of the faulty processing circuit. After restoring operation of the faulty processing circuit, the system transitions back to the TMR mode.

Because two processing circuits are operated in lockstep in the DMR recovery mode 330, occurrence of error in either of the two processing circuits can be detected by monitoring output signals of the processing circuits for discrepancies. If discrepancy between the two processing circuits is detected in the DMR recovery mode 330, a fatal error is detected. The error is fatal because it cannot be determined which of the two processing circuits is in error via comparison. A fatal error may also occur in DMR recovery mode 330 if programmable IC configuration memory becomes corrupt. In response to detecting a fatal error in mode 330, the system transitions to a system reset mode 320, where power-on-reset of the entire system is performed to remove the fatal error and return the system to the TMR mode 310.

Figure 4:
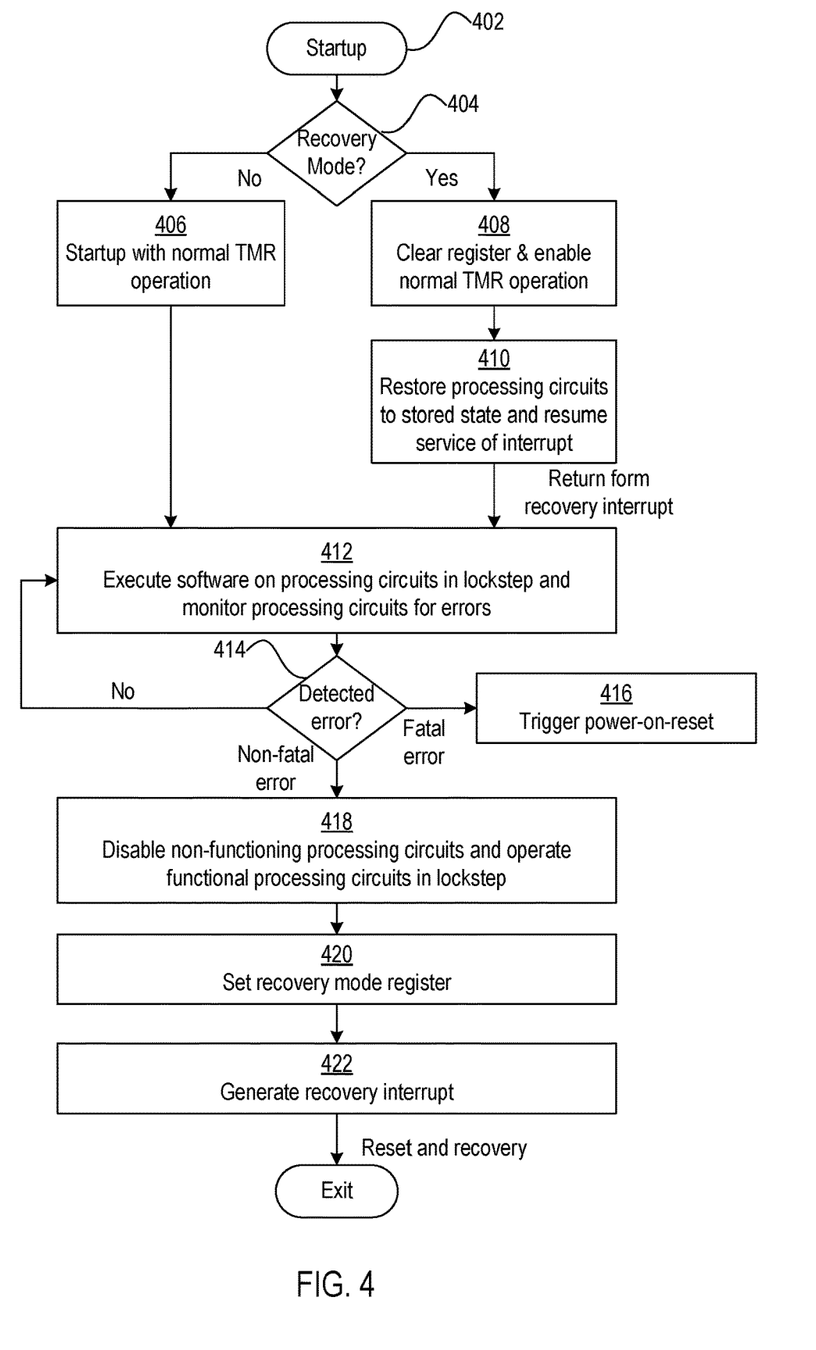
FIG. 4 shows an example process for recovery from error in a redundant processing system, in accordance with one or more implementations.
Figure 5:
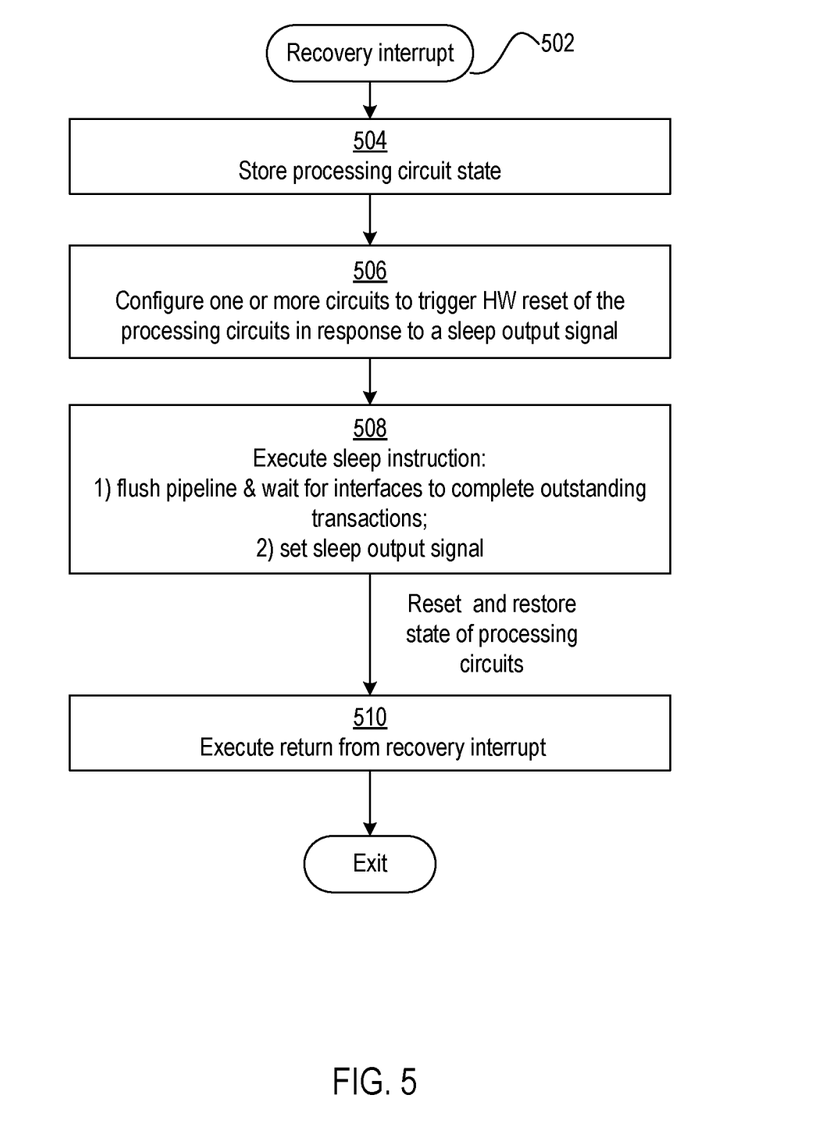
FIG. 5 shows an example software process for recovery of non-fatal error by service of a recovery interrupt, in accordance with one or more implementations.

FIG. 4 shows an example process for recovery from error in a redundant processing system, and FIG. 5 shows an example software process for recovery of non-fatal error via service of a recovery interrupt, for example, generated in the process shown in FIG. 4. For ease of explanation, FIGS. 4 and 5 are described together in the following paragraphs. The processing circuits (e.g., 110, 112, and 114) are started at block 402. As previously described, in some implementations, a status register may be set (e.g., by control circuit 130) to indicate whether or not the system is starting from initial power on is starting from a restoration state. If the status register indicates that the system is performing a fresh start at decision block 404, initialization of software on the processing circuits directs the processing circuits to perform a normal start of the system and execution of the software program using TMR at block 406. At block 412, the processing circuits are monitored for errors (e.g., by error detection circuit 120) until an error is detected at decision block 414. If a fatal error is detected, a system-wide poweron-reset is performed at block 416. If a non-fatal error is detected, non-functioning processing circuits are disabled and functional processing circuits are operated in lockstep at block 418. At block 420, a register is set to indicate that the system is in recovery mode. At block 422, a recovery interrupt is generated. As previously described, the recovery interrupt prompts functional ones of the processing circuits to perform a recovery process. An example discovery process is discussed in connection with FIG. 5.

Turning now to FIG. 5, the recovery interrupt 502 prompts functioning ones of the processing circuits to store a current processing state at block 504. At block 506, one or more circuits (e.g., control circuit 130) are configured by the processing circuits to trigger reset of the processing circuits in response to a sleep output signal. At block 508, a sleep instruction is executed by the functioning processing circuits. In some implementations, execution of the sleep instruction clears processing pipelines and/or instruction pre-fetch of the processing circuits and waits for interfaces to complete pending transactions. After pending transactions have completed, a sleep output signal is asserted by the processing circuits at block 508. As a result of the configuration at block 506, the sleep output signal initiates reset of the processing circuits.

Turning back to FIG. 4, reset of the processing circuits restart the process at block 402. The setting of the status register to indicate recovery mode at block 420 directs the process to block 408 via decision block 404. At block 408, the status register is cleared and lockstep operation of all of the processing circuits are enabled. At block 410, the processing circuits are restored to the processing state that was stored at block 504 in FIG. 5. The clearing of the status register and enabling the processing circuits at block 408 and the restoration of the processing state at block 410 may be performed, for example, by a boot loader configured to initialize and load software into the processing circuits at startup. Restoration of the processing circuits to the restored processing state continues servicing of the recovery interrupt following execution of the sleep instruction. The post-reset service of the recovery interrupt may perform various processes. For example, in some implementations, the indication of recovery mode may be cleared by servicing of the interrupt rather than at block 408. Once post-reset service of the recovery interrupt has completed, a return from interrupt is executed at block 510. Following return from the recovery interrupt, the processing circuits continue operation of the software process, at block 412, at the point at which an error was previously detected at decision block 414.

Figure 6:
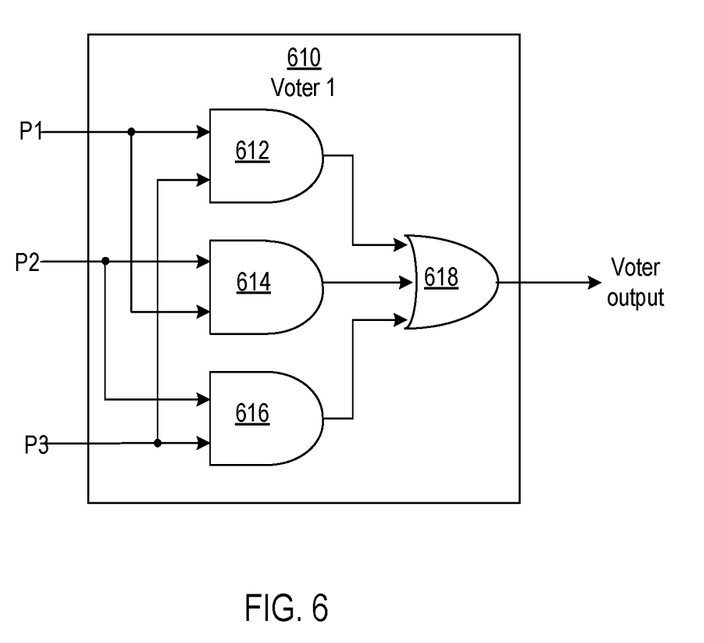
FIG. 6 shows an example majority voter circuit arrangement, in accordance with one or more implementations.

FIG. 6 shows an example majority voter circuit arrangement, in accordance with one or more implementations. The circuit arrangement may be used, for example, to implement one of the majority voter circuits 240 in the error detection circuit 230 shown in FIG. 2. In this example, the majority voter circuit 610 includes three logic AND circuits 612, 614, and 616. Each of the logic AND circuits is configured to perform a logic AND of a respective pair of the signals P1, P2, and P3 output by the processing circuits (e.g., 210, 212, and 214). A logic OR circuit 618 has inputs coupled to respective outputs of each of the logic AND circuits 612, 614, and 616. During operation, if any two of the signals P1, P2, and P3 are equal to logic 1, at least one of the logical AND circuits 612, 614, and 616 will output logic 1. Accordingly, the logic OR circuit 618 will output a logic 1 (the majority value). Conversely, if 1 or less of the all of the signals P1, P2, and P3 are equal to logic 1, all of the AND gates will output a logic 0. Accordingly, the logic OR circuit 618 will output a logic 0 (the majority value).

Figure 7:
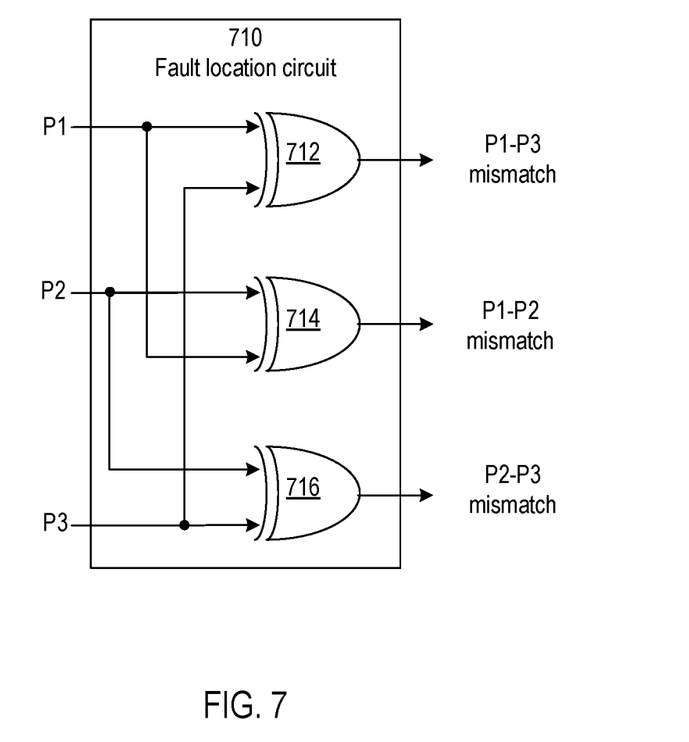
FIG. 7 shows an example fault-location circuit, in accordance with one or more implementations.

FIG. 7 shows an example fault locator circuit, in accordance with one or more implementations. The circuit arrangement may be used, for example, to implement one of the fault location circuits 260 in the error detection circuit 230 shown in FIG. 2. The fault location circuit 710 is configured to compare the signals P1, P2, and P3 output by the processing circuits (e.g., 210, 212, and 214) to generate a set of mismatch signals P1-P3, P1-P2, and P2-P3. In this example, the fault locator circuit 710 includes three exclusive-or (XOR) circuits 712, 714, and 716. Each of the logic XOR circuits is configured to perform a logic XOR of a respective pair of the signals P1, P2, and P3. As described with reference to TABLE 1, the mismatch signals P1-P3, P1-P2, and P2-P3 may be used to determine which of the processing circuits is in error or if the fault location circuit is in error.

FIGS. 6 and 7 depict example implementations of majority voter and fault location circuits. An error detection circuit may be adapted to implement majority voting and fault location using other circuit arrangements than those shown in FIGS. 6 and 7.

Figure 8:
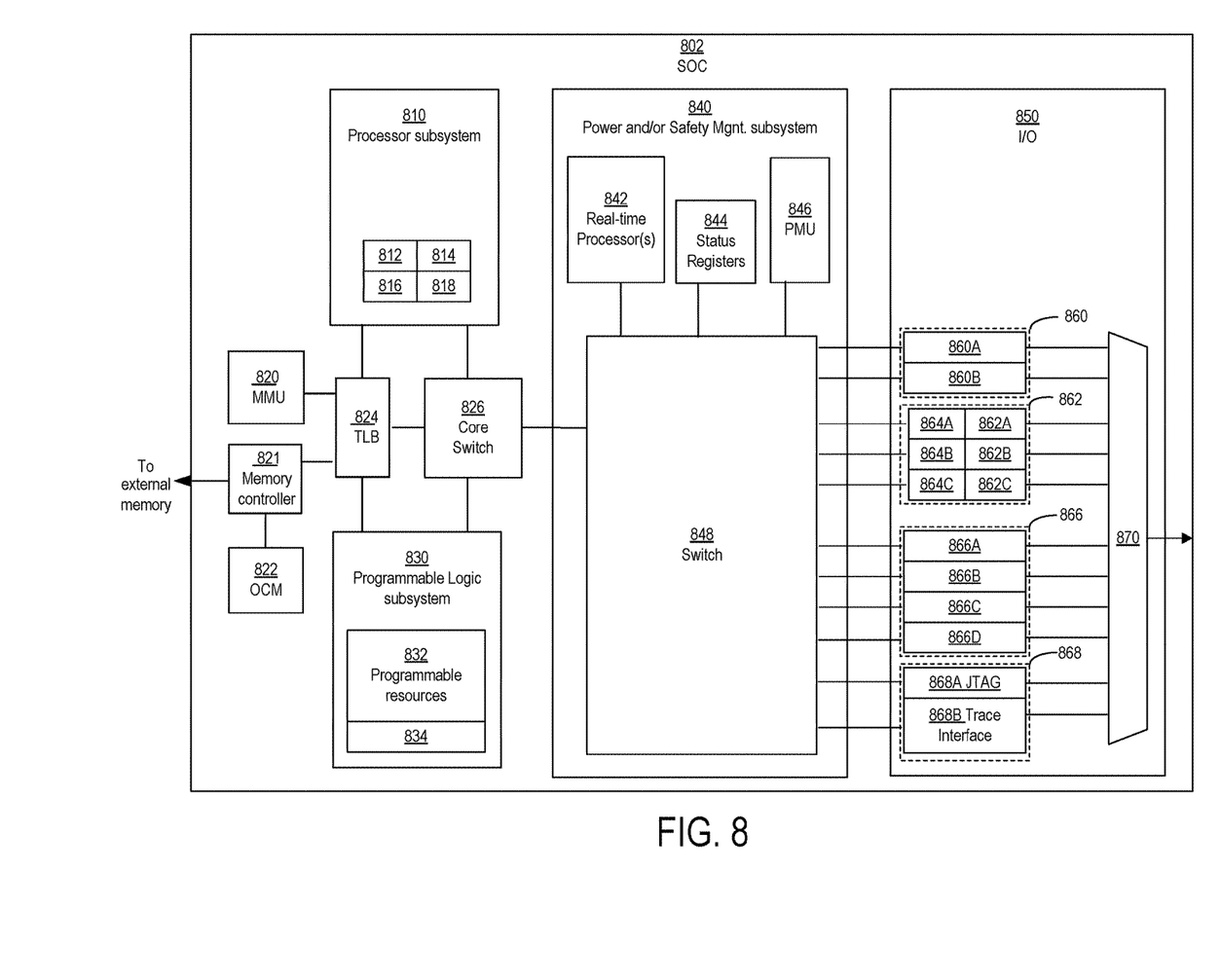
FIG. 8 shows an example SOC that may be configured to implement a redundant processing system, in accordance with one or more implementations.

FIG. 8 shows an example SOC 802 that may be configured to implement a redundant processing system, in accordance with one or more implementations. The SOC may also be referred to as a System On Chip (SOC), which includes a processor sub-system 810 and a programmable logic sub-system 830. In this example, the SOC also includes a sub-system 840 having various circuits for power and/or safety management and an input/output (I/O) sub-system 850 for communication of data with external circuits. The subsystems 810, 830, 840, and 850 may be formed using a plurality of semiconductor dies, and interconnected in an IC package as described in the above examples.

The processing sub-system 810 may be programmed to implement a software portion of the circuit design, via execution of a user program. Alternatively or additionally, the program may implement one or more traffic generators configured to generate data signals to one or more ports of a partial circuit design implemented in programmable resources 832. The program may be specified as part of a configuration data stream or may be retrieved from an on-chip or off-chip data storage device. The processing sub-system 810 may include various circuits 812, 814, 816, and 818 for executing one or more software programs. The circuits 812, 814, 816, and 818 may include, for example, one or more processor cores, floating point units (FPUs), an interrupt processing unit, on chip-memory, memory caches, and/or cache coherent interconnect.

The programmable logic sub-system 830 of the SOC 802 may be programmed to implement a partial circuit design and traffic generation circuits as previously discussed. For instance, the programmable logic sub-system may include a number of programmable resources 832, which may be programmed to implement a set of circuits specified in a configuration data stream. The programmable resources 832 include programmable interconnect circuits, programmable logic circuits, and configuration memory cells. The programmable logic implements the logic of a circuit design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 832 may be programmed by loading a configuration data stream into the configuration memory cells, which define how the programmable interconnect circuits and programmable logic circuits are configured. The collective states of the individual memory cells then determine the function of the programmable resources 832. The configuration data can be read from memory (e.g., from an external PROM) or written into the SOC 802 by an external device. In some implementations, configuration data may be loaded into configuration memory cells by a configuration controller 834 included in the programmable logic sub-system 830. In some other implementations, the configuration data may be loaded into the configuration memory cells by a start-up process executed by the processor sub-system 810.

The SOC 802 may include various circuits to interconnect the processing sub-system 810 with circuitry implemented within the programmable logic sub-system 830. In this example, the SOC 802 includes a core switch 826 that can route data signals between various data ports of the processing sub-system 810 and the programmable logic sub-system 830. The core switch 826 may also route data signals between either of the programmable logic or processing sub-systems 810 and 830 and various other circuits of the SOC, such as an internal data bus. Alternatively or additionally, the processing sub-system 810 may include an interface to directly connect with the programmable logic sub-system—bypassing the core switch 826. Such an interface may be implemented, for example, using the AMBA AXI Protocol Specification (AXI) as published by ARM.

In some implementations, the processing sub-system 810 and the programmable logic sub-system 830 may also read or write to memory locations of an on-chip memory 822 or off-chip memory (not shown) via memory controller 821. The memory controller 821 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 821 is able to communicate is provided for purposes of illustration only and is not intended as a limitation or to be exhaustive. As shown in FIG. 8, the SOC 802 may include a memory management unit 820 and translation look-aside buffer 824 to translate virtual memory addresses used by the sub-systems 810 and 830 to physical memory addresses used by the memory controller 821 to access specific memory locations.

In this example, the SOC includes an I/O sub-system 850 for communication of data with external circuits. The I/O sub-system 850 may include various types of I/O devices or interfaces including for example, flash memory type I/O devices, higher performance I/O devices, lower performance interfaces, debugging I/O devices, and/or RAM I/O devices.

The I/O sub-system 850 may include one or more flash memory interfaces 860 illustrated as 860A and 860B. For example, one or more of flash memory interfaces 860 can be implemented as a Quad-Serial Peripheral Interface (QSPI) configured for 4-bit communication. One or more of flash memory interfaces 860 can be implemented as a parallel 8-bit NOR/SRAM type of interface. One or more of flash memory interfaces 860 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 850 can include one or more interfaces 862 providing a higher level of performance than flash memory interfaces 860. Each of interfaces 862A-862C can be coupled to a DMA controller 864A-864C respectively.

For example, one or more of interfaces 862 can be implemented as a Universal Serial Bus (USB) type of interface. One or more of interfaces 862 can be implemented as a gigabit Ethernet type of interface. One or more of interfaces 862 can be implemented as a Secure Digital (SD) type of interface. One or more of interfaces 862 can be implemented as a PCIe interface.

The I/O sub-system 850 may also include one or more interfaces 866 such as interfaces 866A-866D that provide a lower level of performance than interfaces 862. For example, one or more of interfaces 866 can be implemented as a General Purpose I/O (GPIO) type of interface. One or more of interfaces 866 can be implemented as a Universal Asynchronous Receiver/Transmitter (UART) type of interface. One or more of interfaces 866 can be implemented in the form of a Serial Peripheral Interface (SPI) bus type of interface. One or more of interfaces 866 can be implemented in the form of a Controller-Area-Network (CAN) type of interface and/or an I$^2$C type of interface. One or more of interfaces 866 also can be implemented in the form of a Triple Timer Counter (TTC) and/or a Watchdog Timer (WDT) type of interface.

The I/O sub-system 850 can include one or more debug interfaces 868 such as processor JTAG (PJTAG) interface 868A and a trace interface 868B. PJTAG interface 868A can provide an external debug interface for the SOC 802. Trace interface 868B can provide a port to receive debug, e.g., trace, information from the processing sub-system 810 or the programmable logic sub-system 830.

As shown, each of interfaces 860, 862, 866, and 868 can be coupled to a multiplexer 870. Multiplexer 870 provides a plurality of outputs that can be directly routed or coupled to external pins of the SOC 802, e.g., balls of the package within which the SOC 802 is disposed. For example, I/O pins of SOC 802 can be shared among interfaces 860, 862, 866, and 868. A user can configure multiplexer 870, via a configuration data stream to select which of interfaces 860-868 are to be used and, therefore, coupled to I/O pins of SOC 802 via multiplexer 870. The I/O sub-system 850, may also include a fabric multiplexer I/O (FMIO) interface (not shown) to connect interfaces 862-868 to programmable logic circuits of the programmable logic sub-system. Additionally or alternatively, the programmable logic sub-system 830 can be configured to implement one or more I/O circuits within programmable logic. In this example, the SOC 802 includes sub-system 840 having various circuits for power and/or safety management. For example, the sub-system 840 may include a power management unit 846 configured to monitor and maintain one or more voltage domains used to power the various sub-systems of the SOC 802. In some implementations, the power management unit 846 may disable power of individual sub-systems, when idle, to reduce power consumption, without disabling power to sub-systems in use.

The sub-system 840 may also include safety circuits to monitor the status of the sub-systems to ensure correct operation. For instance, the sub-system 840 may include one or more real-time processors 842 configured to monitor the status of the various sub-systems (e.g., as indicated in status registers 844). The real-time processors 842 may be configured to perform a number of tasks in response to detecting errors. For example, for some errors, the real-time processors 842 may generate an alert in response to detecting an error. As another example, the real-time processors 842 may reset a sub-system to attempt to restore the sub-system to correct operation. The sub-system 840 includes a switch network 848 that may be used to interconnect various sub-systems. For example, the switch network 848 may be configured to connect the various sub-systems 810, 830, and 840 to various interfaces of the I/O sub-system 850. In some applications, the switch network 848 may also be used to isolate the real-time processors 842 from the sub-systems that are to be monitored. Such isolation may be required by certain application standards (e.g., IEC-61508 SIL3 or ISO-26262 standards) to ensure that the real-time processors 842 are not affected by errors that occur in other sub-systems.

A redundant processing system may be implemented using various resources of the SOC 802. For example, redundant processing circuits may be implemented, for example, using processing circuits 812, 814, 816, and 818 of the processor subsystem 810 and/or using programmable resources 832 of the programmable logic subsystem 830. As another example, error detection circuits and a control circuit of the redundant processing system may be implemented in programmable resources 832 of the programmable logic subsystem 830 and/or processors and/or circuits included in the power and/or safety management subsystem 840.

The methods and system are thought to be applicable to a variety of systems that use redundant processing circuits. Other aspects and features will be apparent to those skilled in the art from consideration of the specification. For instance, although aspects and features may in some cases be described in individual figures, it will be appreciated that features from one figure can be combined with features of another figure even though the combination is not explicitly shown or explicitly described as a combination. The portions of the methods and system may be implemented as one or more processors configured to execute software, as an application specific integrated circuit (ASIC), or as a logic on a programmable logic device. Moreover, the various circuits identified herein may share hardware circuitry, such as use a common computer processing unit or digital processing unit. It is intended that the specification and drawings be considered as examples only, with a true scope of the invention being indicated by the following claims.

What is claimed is:

1. An apparatus, comprising:
   at least three redundant processing circuits, configured to execute respective instances of a software program in lockstep;
   an error detection circuit configured to generate a signal indicative of a non-fatal error in response to detecting an error in a minority of the processing circuits, the minority of the processing circuits being non-functioning;
   a control circuit coupled to the processing circuits and configured to, in response to the non-fatal error, disable non-functioning ones of the processing circuits and generate a recovery interrupt signal indicating a recovery interrupt;
   wherein functional ones of the processing circuits are configured to service the recovery interrupt signal using by storing a processing state of at least one of the functional ones of the processing circuits in a memory, triggering a reset of the processing circuits, and signaling a return from the recovery interrupt following the reset;
   wherein the control circuit is further configured to restore the state of the processing circuits to the stored processing state following the reset; and
   wherein the processing circuits are further configured to, in response to the signaled return from the recovery interrupt, continuing execution of the software program on the processing circuits in lockstep from the processing state.

2. The apparatus of claim 1, wherein:
   the functioning ones of the processing circuits are configured to trigger the reset of the processing circuits by executing a sleep instruction;
   execution of the sleep instruction clears pipelines and instruction pre-fetch of the processing circuits and generates a sleep output signal after interfaces have completed pending transactions; and
   the control circuit is further configured to reset the processing circuits in response to the sleep output signal.

3. The apparatus of claim 2, wherein the functional ones of the processing circuits are further configured to, in servicing of the recovery interrupt, configure the control circuit to route the sleep output signal to reset terminals of the processing circuits.

4. The apparatus of claim 1, wherein the control circuit is further configured to:
   set a flag in a status register in response to the signal indicative of the non-fatal error; and
   following the reset:
     perform the restoration of the state of the processing circuits in response to the flag being set in the status register; and
     clear the flag in the status register.

5. The apparatus of claim 1, wherein:
   the error detection circuit is further configured to generate a second signal in response to detecting a fatal error in the set of processing circuits; and
   the control circuit is configured to perform a power-on-reset of the apparatus in response to the second signal.

6. The apparatus of claim 5, further comprising:
   wherein the error detection circuit includes a plurality of majority voter circuits, each configured to output a data value equal to a data value output by a majority of the processing circuits; and
   a comparator circuit, configured to output the second signal indicative of the fatal error in response to the plurality of majority voter circuits outputting different data values from one another.

7. The apparatus of claim 5, wherein the error detection circuit includes a plurality of fault location circuits, each configured to:
   compare data values output by the processing circuits;
   output a first signal indicative of a non-fatal error in response to the data values output being different from one another and indicative of a particular one of the three or more processing circuits that is in error; and
   output a second signal indicative of a fatal error in response to the data values output being indicative of the fatal error.

8. The apparatus of claim 7, wherein the error detection circuit further includes a comparator circuit, configured to output a third signal indicative of the fatal error in response to the plurality of error location circuits outputting different signals from one another.

9. The apparatus of claim 5, wherein the error detection circuit is further configured to, while the non-functioning ones of the processing circuits are disabled, generate a signal indicative of the fatal error in response to the functional ones of the processing circuits outputting different data values than one another.

10. A method comprising:
executing in lockstep respective instances of a software program on three or more redundant processing circuits of a processing system;
in response to detecting a non-fatal error in a minority of the processing circuits, wherein the minority of the processing circuits are non-functioning, generating, by a control circuit, an interrupt and disabling the non-functioning ones of the processing circuits;
servicing the interrupt, using the functional ones of the processing circuits by storing a processing state of at least one of the functional ones of the processing circuits and triggering a reset of the processing circuits;
following the reset, restoring, using the control circuit, state of the processing circuits to the stored processing state;
signaling, using the functional ones of the processing circuits, a return from the interrupt; and
in response to the signaled return from the interrupt, continuing execution of the software program on the processing circuits in lockstep at a point at which the non-fatal error was detected.

11. The method of claim 10, wherein:
the generating of the interrupt includes setting a flag in a status register;
the restoring the state of the processing circuits is performed, following the reset, in response to the flag being set in the status register; and
further comprising clearing the flag in the status register following the reset.

12. The method of claim 10, wherein:
the triggering of the reset of the processing circuits includes executing a sleep instruction; and
execution of the sleep instruction clears pipelines and instruction pre-fetch of the processing circuits and generates a sleep output signal after interfaces have completed pending transactions.

13. The method of claim 12, wherein the servicing of the interrupt further includes configuring a sleep control circuit to route the sleep output signal to reset terminals of the processing circuits.

14. The method of claim 10, further comprising using the control circuit to trigger a power-on-reset of the processing system in response to detecting a fatal error.

15. The method of claim 14, wherein the detecting of the fatal error and the non-fatal error includes, for each of a plurality of error-location circuits:
comparing data values output by the processing circuits;
outputting a first signal indicative of the non-fatal error in response to the data values output being different from one another and indicative of a particular one of the processing circuits that is in error; and
outputting a second signal indicative of the fatal error in response to the data values output being indicative of the fatal error.

16. The method of claim 15, wherein the detecting the fatal error and the detecting the non-fatal error further includes, comparing signals output by the plurality of error-location circuits; and outputting a third signal indicative of a different fatal error in response to the plurality of error-location circuits outputting different signals from one another.

17. The method of claim 14, wherein the detecting the fatal error and the detecting the non-fatal error includes:
for each of a plurality of majority-voter circuits, outputting a data value equal to a data value output by a majority of the processing circuits;
comparing signals output by the plurality of majority-voter circuits; and
outputting a signal indicative of a different fatal error in response to the plurality of majority-voter circuits outputting different data values from one another.

18. The method of claim 14, wherein the detecting the fatal error and the detecting the non-fatal error further includes, while the non-functioning ones of the processing circuits are disabled, generating a signal indicative of a further fatal error in response to the functional ones of the processing circuits outputting different data values than one another.

19. The method of claim 14, further comprising:
programming configuration memory on a programmable IC to configure a set of programmable logic circuits on the programmable IC to form the processing circuits; and
in response to one or more memory cells in the configuration memory becoming upset, using the control circuit to trigger a power-on-reset of the processing circuits.

20. An apparatus, comprising:
at least three redundant processing circuits configured to execute respective instances of a software program in lockstep;
an error detection circuit configured to detect a non-fatal error in a minority of the processing circuits, the minority of the processing circuits being non-functioning;
a control circuit coupled to the processing circuits and configured to, in response to the non-fatal error, disable the non-functioning processing circuits and generate a recovery interrupt;
wherein functional ones of the processing circuits are configured to service the recovery interrupt by storing a processing state of at least one of the functional ones of the processing circuits in a memory, triggering a reset of the processing circuits, and signaling a return from the recovery interrupt following the reset;
wherein the control circuit is further configured to restore state of the processing circuits to the stored processing state following the reset; and
wherein, upon return from the recovery interrupt following the reset, the processing circuits are configured to continue execution of the software program in lockstep from the processing state.

* * * * *